(12) United States Patent
Olsson

(10) Patent No.: US 6,706,990 B1
(45) Date of Patent: Mar. 16, 2004

(54) RESISTANCE WELDER MULTI-PURPOSE ATTACHMENT

(76) Inventor: Goran K. Olsson, 926 S. Andreasen Dr., #101, Escondido, CA (US) 92029

( * ) Notice: Subject to any disclaimer, the term of this patent is extended or adjusted under 35 U.S.C. 154(b) by 0 days.

(21) Appl. No.: 10/309,553

(22) Filed: Dec. 3, 2002

(51) Int. Cl.[7] .............................................. B23K 11/11
(52) U.S. Cl. ..................................... 219/86.21; 219/90
(58) Field of Search .............................. 219/86.21, 90, 219/86.25

(56) References Cited

U.S. PATENT DOCUMENTS

| | | | | |
|---|---|---|---|---|
| 1,084,673 A | * | 1/1914 | Thomson ................. | 219/86.25 |
| 1,728,616 A | * | 9/1929 | Kondakjian ............. | 219/86.25 |
| 2,130,657 A | * | 9/1938 | Watkin ..................... | 219/86.25 |
| 2,452,009 A | * | 10/1948 | Woodward ............... | 219/86.25 |
| 4,114,017 A | * | 9/1978 | Smith .......................... | 219/90 |
| 4,504,725 A | * | 3/1985 | Beneteau ................. | 219/86.25 |
| 4,879,447 A | * | 11/1989 | Umeda .................... | 219/86.25 |
| 5,164,564 A | * | 11/1992 | Umeda .................... | 219/86.25 |

* cited by examiner

Primary Examiner—Clifford C. Shaw
(74) Attorney, Agent, or Firm—Donn K. Harms

(57) ABSTRACT

A device for use in combination with a hand held resistance welder to allow for insertion of an elongated portion of metal between two electrodes for welding hard to reach areas. The device features a mount to attach the device to a conventional hand held resistance welder with a laterally translatable pressure shaft. Once operatively mounted, translation of the pressure shaft translates a pivoting electrode which in turn rotates a primary mounting arm which causes two electrodes to move together and form a weld on the metal inserted.

16 Claims, 2 Drawing Sheets

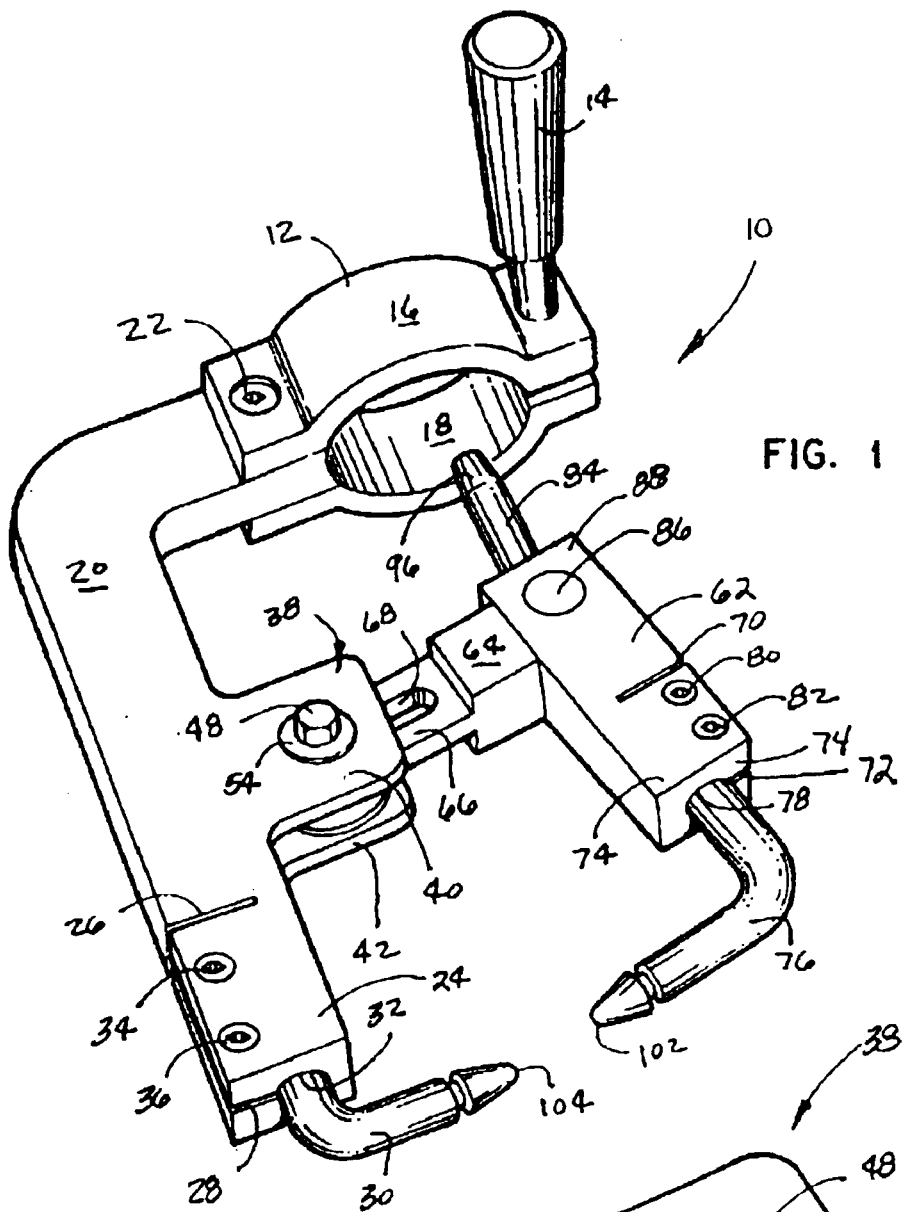
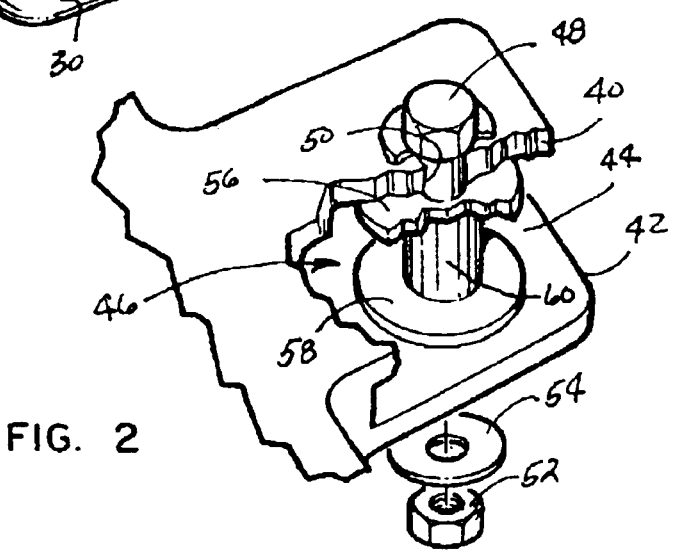

RESISTANCE WELDER MULTI-PURPOSE ATTACHMENT

FIELD OF THE INVENTION

The disclosed device relates to the field of welding. More particularly this invention relates to the field of resistance or spot welding of two or more pieces of metal to each other using electric current. The device may be attached and used in combination with spot-welding guns both fixed and portable. The device herein disclosed and described features a new and unique multi-purpose attachment for a widely used style of spot welding guns which enables a larger opening or throat and welding of metal inserted through that opening in a direction parallel to the direction of the lateral translation of such welding guns. The device also features easily replaceable electrodes in varying sizes along with making the tool more adaptable to be used in vehicle and machinery repair and manufacturing.

BACKGROUND OF THE INVENTION

Spot welding or resistance welding is a common manufacturing procedure of permanently attaching two or more pieces of material, most often steel, together by the means of placing an electrode on either side of the material and applying a given force and electrical high amperage electric current for a period of time. Resistance from the material creates enough heat to melt and weld the material permanently together with no filler metal or flux required. A great percentage of the assembly of automobiles is accomplished with spot welding guns operated on robotic arms. This same procedure is commonly used in many repair processes where the devices used need to be portable and more adjustable than those used for mass production manufacturing tasks. Conventional spot welders use a gun having two electrode holders, one fixed and the other laterally translatable, extending from a handle adapted to pinch together along a line parallel, called a C-type, or perpendicular, to the handle axis called the X-type. The pinching force may be applied in several ways: manually, electrical solenoid, or by pneumatic or hydraulic cylinders, or any combination thereof. The spot welding guns are connected to a welder power supply either through heavy cables or by means of trans-guns where a transformer is connected directly to the spot welding gun carrying the high amperage current necessary for welding and to a source of air or electricity for applying the pinching force.

A number of different welder and electrode configurations have been developed for special purpose welding. While effective for simply welding metal sheets together along an edge or for a single specific arrangement of metal structures, these devices are not portable or easily adaptable to the wide variety of applications necessary in repair and maintenance work, in particular auto body repair work. The portable welders available are limited in their capabilities.

In many cases, it is necessary to spot weld at locations well away from the distal edges of the metal being welded such as on automobile fenders or other metal structures that tend to have long wall portions extending from a weld at a base to an adjacent piece of sheet metal. Often welds must be made in areas having large or thick cross sections between the edge of the structure and the area to be welded. It is difficult and expensive to construct or assemble a special spot welder for each of these difficult situations for small or independent maintenance and repair shops.

Thus, there is a continuing need for spot welding guns and attachments to conventional welders using electrode holders that are interchangeable and adjustable. Such a device should have capabilities of welding at a variety of locations with a wider throat opening capability. Such a device should also allow for welding at the base of a long wall portion of sheet metal by insertion over the distal end of the sheet metal opposite the weld.

U.S. Pat. No. 1,084,673 (Thomson) relates to a class of electric welding machines known as spot welders. In this class of machines as ordinarily constructed, the spot welding electrodes by which the welding pressure is applied at the point of the work where the weld is to be formed between the plates or sheets of metal are mounted on end of rigid arms extended from the base or pedestal. This 673 patent of Thomson illustrates an example of the conventional stationary spot welding machines.

U.S. Pat. No. 1,728,616 (Kondakjian) describes improvements in electric spot welding machines, and the invention has reference more particularly to a simply constructed and easily actuated spot welding machine provided with electrodes having an initial mechanical clamping action to position and hold the work in combination with a novel means for controlling the flow of electric current therethrough after the work is operatively engaged by the electrodes. This 616 patent of Kondakjian is another example of the large stationary spot welders that have been used for years.

U.S. Pat. No. 2,130,657 (Watkin) teaches of a welding machine capable of welding small gauge material, which requires delicate adjustments of the time during which the welding current is flowing so as to prevent burning of the work. The invention also provides a machine which is readily transportable in a compact form and capable of delicate work. The 657 patent of Watkin is another example of a complete spot welding machine capable of fine adjustments and somewhat portable. It is still designed to be mounted in a stationary position and used for production work not repair work.

U.S. Pat. No. 2,452,009 (Woodward) discloses an invention in one of its forms with the upper electrode of a resistance-welding machine that is secured to an arm which is adjustably clamped to a vertical support secured in an insulated relation to the frame of the machine. The lower electrode is secured to one end of a pivoted support arm which is bifurcated at the other end to provide upper and lower fork portions. A toggle linkage connects the upper fork portion to a pressure applying pedal, and a control switch is mounted on the lower fork portion so as to be actuated in response to relative deformation of the forks to effect energization of the welding electrodes only after a predetermined electrode pressure has been attained. The 009 patent of Woodward is another example of stationary spot welding units commonly used in mass production.

U.S. Pat. No. 4,504,725 (Beneteau) additionally describes a resistance welding apparatus with a compound electrode holder provided. The apparatus is more effective in resistance welding members of U-shaped cross section than apparatus heretofore known. The compound electrode holder enables its electrode to travel in one accurate path throughout most of its travel or stroke and to move in a second accurate path as it approaches the work piece. The compound electrode holder achieves a large path of travel of its electrode and at the same time accurate alignment of the electrodes and reliable welds are attained. The 725 patent of Beneteau is still another stationary welding apparatus designed for mass production with improved electrode travel and increased throat size and pressure, but has not been designed to be used as a portable repair tool.

U.S. Pat. No. 4,879,447 (Umeda) teaches a welding gun with a movable arm to move in a large angle or a long distance, relative to a fixed arm with a slight reciprocal movement of a rod attached to a piston without employing a complicated mechanism such as the guide roller, guide plate, and guide groove employed in prior welding guns. The pressing force applied to a work piece by the movable arm is generated by a forward movement of the rod. The 447 patent of Umeda is an example of the spot welding guns that have been adapted to be used in the field of robotic manufacturing. They have increased the throat opening and added a cam action to the pressure in the closure, but this unit would not be used as a portable device and would not be easily adaptable to many different repair situations.

U.S. Pat. No. 5,164,564 (Umeda) teaches of a means to adapt a spot welding gun to a robotic arm. These systems are primarily used in mass productions and are not suitable for any kind of repair work.

PCT Patent, International Publication Number WO 00/15379 (Stenkvist) discloses a device and method for resistance welding of objects by spot welding with a spot welding gun comprised of a C-formed arm, a front electrode and a back electrode, and a cylinder which is driven pneumatically or in another way. The back electrode is axially translatable in a limited distance by the cylinder. The spot welding gun is arranged to clamp the objects between the electrode tips by impelling the cylinder and providing a welding current to flow between said electrode tips. According to the invention the back electrode has been arranged to release from, moved axially in relation to, and fastened to the cylinder to enable or simplify positioning of the spot welding gun so that the electrodes are on each side of the objects to be welded. The 15379 patent of Stenkvist describes the conventional C-formed arm portable spot welding devices used in the repair field. This device is limited by the throat width and the ease of adapting to unconventional situations, especially the automobile repair field requiring several styles of the spot welders in each maintenance and repair shop.

Consequently there exists a need for an apparatus which will easily attach to and adapt a conventional portable spot welding gun to the varying tasks required in the repair field. Such a device should provide for easy replacement or changing of the electrodes used. Such a device should function to allow insertion of elongated wall surfaces of sheet metal being welded, by insertion of the distal ends thereof, between the electrodes and thereby allow for easy welding at the base attachment of the sheet metal wall to adjacent surfaces.

SUMMARY OF THE INVENTION

The device herein disclosed describes a new and unique resistance welder multi-purpose attachment capable of converting a conventional C-formed arm hand-held resistance welder into a more universal X-type tool. This conversion enhances the productivity of the C-formed welder allowing welds between electrodes which compress in a direction perpendicular or normal to the direction of lateral translation of the moving electrode on the hand-held welder. Thus, the device when used in combination with a hand-held welder allows it to accomplish multiple tasks and welding in two directions even over elongated sheet metal wall surfaces, where in the past several welders were required to perform the same tasks. The herein disclosed resistance welder multi-purpose attachment is composed of the hand-held resistance welder clamping ring or other means of attachment to a welder used in combination herewith, which is tightened in place around the clamp section of the welder by means of the supporting handle or other means of compression of the electrode mounting arm to the resistance welder used in combination herewith. The compression means of attachment used in the current preferred embodiment consists of two sides coupled with a secondary electrode-mounting arm by the means of an attachment screw, or they may be permanently welded together. The distal end of the secondary electrode mounting arm provides a means of attachment to a welder using a transverse cut, and a parallel cut creating a clamp for the secondary electrode when inserted into the mounting orifice and the electrode clamp screws tightened. The yoke section of the secondary electrode mounting arm has two side flanges creating a cavity housing a spool type insulator held in place by the means of a pivot bolt inserted through common inline orifices and held in place by a nut and washer. A spool type insulator is composed of two side plates and a hollow central core which the pivot bolt passes through. One or both side plates may be removable from the spool type insulator. The primary electrode mounting arm incorporates a slotted arm section that may be an integral part of the primary electrode mounting arm or may be a separate piece of a plastic or other material for the insulative purposes, attached by conventional fastening means to the primary electrode mounting arm. The slotted section incorporates a reduced section to be held between the side flanges of the yoke section with a slot held captive by the spool type insulator hollow central core and the pivot bolt. This slot also provides a means to allow the arm to float or move in two directions during the clamping process which is an important factor in preventing downward pressure on the forward moving arm. While the device would function without this slotted engagement, it functions much better with this provision for both rotational and lateral translation thereby preventing the downward pressure on the translating electrode of the welder used in combination herewith. The primary electrode-mounting arm has a transverse cut and a parallel cut at the distal end creating a clamp for the primary electrode when inserted into the orifice and electrode clamp screws are tightened. A pivoting electrode connector and the pivoting electrode connector pivot pin are located at the opposite distal end of the primary electrode-mounting arm.

As the hand-held resistance welder is held within the two sides of the welder clamp ring, the electrical ground contact is made between the inner surface of the welder clamp rings and the clamp section of the hand-held resistance welder. The locking tapered section of the pivoting electrode connector mates with the tapered bore in the cylinder pressure shaft so that the high amperage current necessary for welding passes through to the primary electrode. This electrical communication could also be achieved or enhanced by the use of a communicating electrode to ground.

A unique and preferred feature of the disclosed device is provided when the cylinder pressure shaft on the welder used herewith translates forward. The combination of the pivoting electrode connector and the slot in the slotted arm, allows the primary electrode mounting arm to reposition the throat position and the point of clamping the material therebetween to accomadate minor thickness variations without readjustment. Once inbetween n the primary electrode tip and the secondary electrode tip a clamping force is provided when the pressure shaft is translated forward. With the electrodes being "L" shaped, a means of adjustment of the electrode point of contact from the hinged engagement of the two muonting arms thereby allowing insertion of longer pieces of sheet metal can also be provided using electrodes with differnt lengths on the portion of which mounts to the device.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

It is an object of this portable resistance welder multi-purpose attachment to create a means to enlarge the opening or throat of a conventional hand held resistance welder.

Yet another object of the device herein disclosed is the provision of an attachment to a conventional C-type welder that positions the direction of the clamping electrodes in a direction substantially normal to the direction of the translating electrode of the welder.

An additional object of the device herein disclosed is the provision of a welder with compressible electrodes which allows for the insertion of the distal end of very long sheets of metal through the electrodes and subsequent welding at the base of the sheets so inserted.

Another object of this invention is to produce a portable resistance welder multi-purpose attachment to make the hand held resistance welders more suitable for varying tasks in the maintenance and repair field, especially in the automotive field.

These together with other objects and advantages which become subsequently apparent reside in the details of the construction and operation as more fully hereinafter described and claimed, reference being made to the accompanying drawings forming a part thereof, wherein like numerals refer to like parts throughout.

BRIEF DESCRIPTION OF THE DRAWINGS

The accompanying drawings which are incorporated in and form a part of this specification illustrate embodiments of the invention and together with the description serve to explain the principles of this invention.

FIG. 1 depicts a perspective view of the disclosed resistance welder multi-purpose attachment operatively engaged with a conventional hand held resistance welder used in combination herewith.

FIG. 2 depicts a breakaway view of the yoke section of the secondary electrode-mounting arm.

DETAILED DESCRIPTION OF THE PREFERRED EMBODIMENTS

Figure 4:
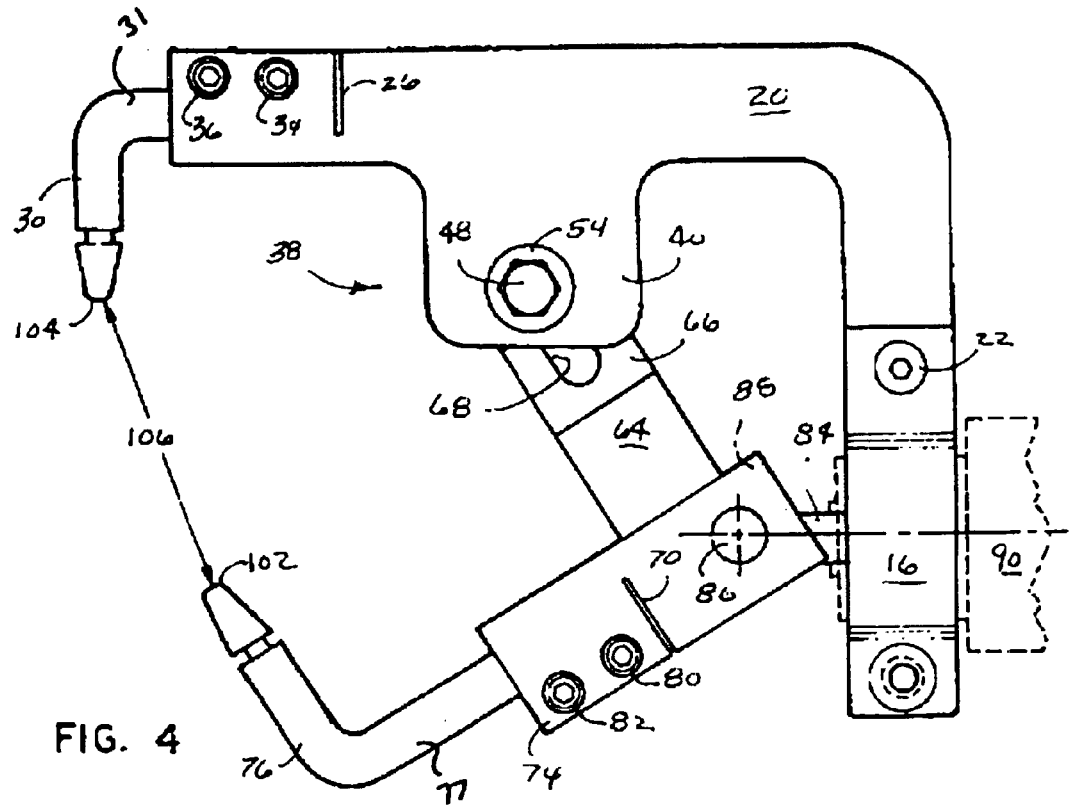
FIG. 4 depicts a side view of the disclosed resistance welder multi-purpose attachment with the electrodes in an extended position illustrating the throat dimension and the ability to insert long portions of wall surface therebetween and weld at their base attachment to adjacent surfaces.

Referring now to the drawings, wherein similar parts of the invention are identified by like reference numerals, there is seen in FIG. 1, the device 10 is a portable resistance welder multi-purpose attachment composed of a means of attachment to a hand held welder used in combination herewith which in the current favored embodiment is provided by clamping ring 12 which is tightened in place by the means of the supporting handle 14. The clamping ring 12 consists of two sides, a left side 16 and right side 18 coupled with a secondary electrode mounting arm 20 by the means of an attachment screw 22 or they may be permanently welded together. Of course those skilled in the art will no doubt realize that other means for cooperative engagement with a hand held resistance welder could be used and such are anticipated.

The distal end 24 of the secondary electrode mounting arm 20 provides a means for removable attachment of secondary electrode 30 to the mounting arm 20 in the form of a transverse cut 26 and a parallel cut 28 creating a clamp for the secondary electrode 30 when inserted into the orifice 32 and the electrode clamp screws 34 and 36 are tightened. When mounted in the current favored embodiemnt, the secondary electrode 30 is "L" shaped and allows for a means of adustment fo the distance of the tip of the electrode from the mount or the hinged engagement of the two mounting arms by sliding it in and out of the attachment to the mounting arm 20. Or, the portion of the electrode attaching to the mounting arm 20 could be lengthened, or a kit of different secondary electrodes 30 could be provided which provide varying distances for the tip of the secondary electrode 104 from the mounting arm 20. The same means of adjustment is provided by sliding the primary electrode 76 in its mount to the mounting arm 74 or by providing a kit of primary electrodes 76 with varying lengths of the first portion which mounts to the mounting arm 76 before the bend. Other means for attachment of the secondary electrode 30 to the mounting arm 20 could be used and such are anticipated, however the depicted arrangement is used in the current best mode due to its simplicity and easy functionality.

The yoke section 38 of the secondary electrode mounting arm 20 illustrated in FIG. 2, has two side flanges 40 and 42 defining a cavity 44 housing a spool type insulator 46 held in place by the means of a pivot bolt 48 passing through common inline orifices 50 and held in place by a nut 52 and washer 54. This provides a means of electrical insulation of the primary electrode mounting arm 62 from the electrode mounting arm 20 and while other means of electrical insulation could be used and are anticipated, the spool type insulator 46 is used in the current best mode of the device 10.

The spool type insulator 46 is composed of two side plates 56 and 58 and a hollow central core 60 which the pivot bolt 48 passes through. One or both side plates 56 and 58 may be removable from the spool type insulator. The primary electrode mounting arm 62 incorporates a slotted arm section 64 that may be an integral part of the primary electrode mounting arm 62 or may be a separate piece of a plastic or other material for insulative purposes, attached by a conventional fastening means which could also provide the means of insulation from the mounting arm 20. The slotted arm section 64 incorporates a reduced section 66 to be held between the side flanges 40 and 42 of the yoke section 38 with slot 68 held captive by the spool type insulator hollow central core 60 and the pivot bolt 48. The primary electrode mounting arm 62 provides a means of attachment of a primary electrode 76 in the form of a transverse cut 70 and a parallel cut 72 at the distal end 74 creating a clamp for cooperative engagement of the primary electrode 76 when inserted into an orifice 78 and electrode clamp screws 80 and 82 are tightened. A pivoting electrode connector 84 and the pivoting electrode connector pivot pin 86 located at the opposite distal end 88 of the primary electrode mounting arm 62 provides the current best means for communication of electrical current to the primary electrode 76 via the mounting arm 62 as well as a means to impart rotational force to the mounting arm 62 from a laterally translating-electrode or cylinder pressure shaft 100 of a hand held resistance welder 90 used in combination herewith. Using the pivoting electrode connector 84 to provide both lateral force and electrical current is highly desirable in that it eliminates the need for cables to communicate electrical current to the primary electrode 76.

Figure 3:
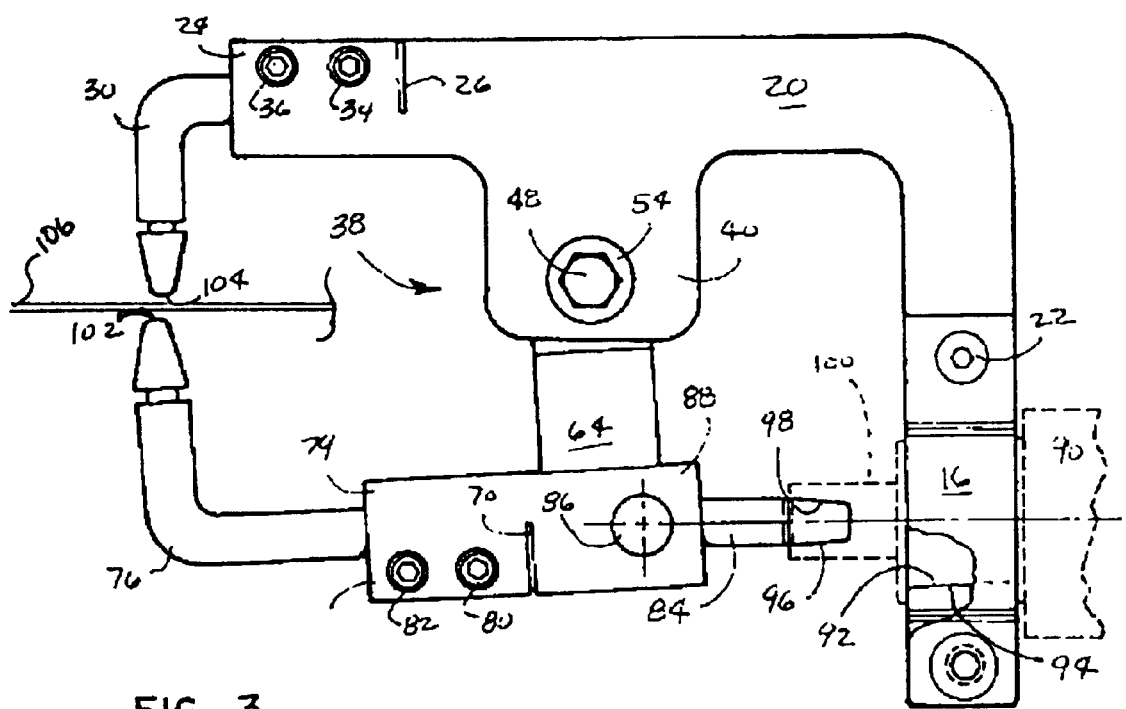
FIG. 3 depicts a side view of the disclosed resistance welder multi-purpose attachment with the electrodes in a compressed position with the hand held resistance welder in phantom.

FIG. 3 depicts the location of the hand held resistance welder 90 used in combination herewith and shown in phantom, held within the two sides 14 and 16 of the welder clamp ring 12. Or as already noted, other means of attachment of the device to the welder 90 could be used. Electrical ground contact is made between the inner surface 92 of the welder clamp rings 14 and 16 and the clamp section 94 of the hand held resistance welder 90. Additionally clarified is the locking tapered section 96 of the pivoting electrode connector 84 mating with the tapered bore 98 in the cylinder pressure shaft 100 where the high amperage electrical current is communicated through to the primary electrode 76 when the resistance welder 90 is activated. FIG. 3 indicates the close proximity of the primary electrode 102 and the secondary electrode 104 when the cylinder pressure shaft 100 is at its maximum extension and the ability of the device to allow for insertion of elongated portions of metal therebetween and to affix a weld at a point well down the elongated inserted metal wall portion 106. Of course the distance of insertion is adjustable by the use of primary electrodes 76 and secondary electrodes 30 with longer or shorter attachment portions 77 and 31 respectively, as noted above, thereby also providing a means to adjust the total possible distance of insertion of elongated metal 106 between the two electrodes and achieve a weld. This would be most useful when repairing or welding a fender on a car or some other sheet metal that requires extensive extension of the sheet metal into the device 10 to make welds at a base edge.

FIG. 4 illustrates the device 10 with the primary electrode 76 and the secondary electrode 30 in the maximum extended throat position 106 illustrating the throat dimension, with the hand held resistance welder 90 in phantom. FIG. 4 displays another unique feature of the device 10 in that when the cylinder pressure shaft 100 translates forward, the slot 68 in the slotted arm 64 allows the primary electrode mounting arm 62 to laterally translate while rotating and-eliminate downward force upon the cylinder pressure shaft 100 during lateral translation thereof.

The device 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described, may be employed for providing a portable resistance welder multi-purpose attachment in accordance with the spirit of this invention, and such changes, alternations and modifications as would occur to those skilled in the art are considered to be within the scope of this invention as broadly defined in the appended claims. As such, while the present invention has been described herein with reference to particular embodiments thereof, a latitude of modifications, various changes and substitutions are intended in the foregoing disclosure, and will be appreciated that in some instance some features of the invention will be employed without a corresponding use of other features without departing from the scope of the invention as set forth in the following claims.

What is claimed is:

1. A resistance welding apparatus for use in combination with a hand held resistance welder having a translating pressure shaft comprising:
   a primary mounting arm having an engagement end and a distal end opposite said engagement end;
   a secondary mounting arm having a first leg substantially normal to a second leg, said second terminating at a second end;
   means of attachment of said first leg to said hand held resistance welder;
   means for rotational engagement of said primary mounting arm with said secondary mounting arm at a pivot point;
   a primary electrode having an attachment end and first contact point;
   a secondary electrode having an attachment end and having a second contact point having a center axis therethrough;
   means of attachment of said attachment end of said primary electrode at said distal end of said primary mounting arm;
   means of attachment of said attachment end of said secondary electrode at said second end of said secondary mounting arm;
   an electrode connector rotationally engaged at said engagement end of said primary mounting arm;
   means for cooperative engagement of said electrode connector to a laterally translating shaft on said resistance welder, said translating shaft translatable along a shaft axis between an extended position and a retracted position, said shaft axis being substantially normal to said center axis;
   means to electrically insulate said primary mounting arm from said secondary mounting arm;
   said first electrode translatable toward said second electrode to a contact position with said first contact point closest to said second contact point when said when said laterally translating shaft is moved to said extended position; and
   means to communicate electrical current to said first electrode and said second electrode whereby metal inserted therebetween is spot welded when said laterally translating shaft is moved to said extended position.

2. The resistance welding apparatus of claim 1 additionally comprising:
   means for slidable engagement of said primary mounting arm with said secondary mounting arm at said pivot point.

3. The resistance welding apparatus of claim 2 wherein said means for slidable engagement of said primary mounting arm with said secondary mounting arm at said pivot point and said means for rotational engagement of said primary mounting arm with said secondary mounting arm at a pivot point comprise a slot in said mounting arm engaged upon a pivot bolt engaged with said secondary mounting arm.

4. The resistance welding apparatus of claim 1 wherein said means of attachment of said first leg to said hand held resistance welder comprise:
   a collar formed in said primary electrode mounting arm said collar having an aperture therein shaped to cooperatively engage with the exterior surface of said resistance welder; and means of compression of said collar to compressibly engage said aperture upon said exterior surface.

5. The resistance welding apparatus of claim 2 wherein said means of attachment of said first leg to said hand held resistance welder comprise:

a collar formed in said primary electrode mounting arm said collar having an aperture therein shaped to cooperatively engage with the exterior surface of said resistance welder; and means of compression of said collar to compressibly engage said aperture upon said exterior surface.

6. The resistance welding apparatus of claim 3 wherein said means of attachment of said first leg to said hand held resistance welder comprise:

a collar formed in said primary electrode mounting arm said collar having an aperture therein shaped to cooperatively engage with the exterior surface of said resistance welder; and means of compression of said collar to compressibly engage said aperture upon said exterior surface.

7. The resistance welding apparatus of claim 1 additionally comprising:

means of adjustment of the distance of said contact position from said pivot point.

8. The resistance welding apparatus of claim 2 additionally comprising:

means of adjustment of the distance of said contact position from said pivot point.

9. The resistance welding apparatus of claim 3 additionally comprising:

means of adjustment of the distance of said contact position from said pivot point.

10. The resistance welding apparatus of claim 7 wherein said means of adjustment of the distance of said contact position from said pivot point comprises:

said primary electrode having L shape with a first portion between an elbow and said attachment end of said first electrode;

said secondary electrode having L shape with a first portion between an elbow and said attachment end of said second electrode;

said first portion of said primary electrode laterally translatable in its attachment to said primary mounting arm;

said first portion of said secondary electrode laterally translatable in its attachment to said secondary mounting arm.

11. The resistance welding apparatus of claim 8 wherein said means of adjustment of the distance of said contact position from said pivot point comprises:

said primary electrode having L shape with a first portion between an elbow and said attachment end of said first electrode;

said secondary electrode having L shape with a first portion between an elbow and said attachment end of said second electrode;

said first portion of said primary electrode laterally translatable in its attachment to said primary mounting arm;

said first portion of said secondary electrode laterally translatable in its attachment to said secondary mounting arm.

12. The resistance welding apparatus of claim 9 wherein said means of adjustment of the distance of said contact position from said pivot point comprises:

said primary electrode having L shape with a first portion between an elbow and said attachment end of said first electrode;

said secondary electrode having L shape with a first portion between an elbow and said attachment end of said second electrode;

said first portion of said primary electrode laterally translatable in its attachment to said primary mounting arm;

said first portion of said secondary electrode laterally translatable in its attachment to said secondary mounting arm.

13. The resistance welding apparatus of claim 7 wherein said means of adjustment of the distance of said contact position from said pivot point comprises:

a kit comprising a plurality of said primary electrodes having different lengths of said first portion of said primary electrodes; and a kit comprising a plurality of said secondary electrodes having different lengths of said first portion of said secondary electrodes.

14. The resistance welding apparatus of claim 8 wherein said means of adjustment of the distance of said contact position from said pivot point comprises:

a kit comprising a plurality of said primary electrodes having different lengths of said first portion of said primary electrodes; and a kit comprising a plurality of said secondary electrodes having different lengths of said first portion of said secondary electrodes.

15. The resistance welding apparatus of claim 9 wherein said means of adjustment of the distance of said contact position from said pivot point comprises:

a kit comprising a plurality of said primary electrodes having different lengths of said first portion of said primary electrodes; and a kit comprising a plurality of said secondary electrodes having different lengths of said first portion of said secondary electrodes.

16. The resistance welding apparatus of claim 1 wherein said means to communicate electrical current to said first electrode and said second electrode comprises:

said first electrode in electrical communication with said pressure shaft through said primary mounting arm and said pivoting connector; and said second electrode is in electrical communication with said secondary mounting arm which is in communication with a ground, whereby electric current communicated from said pressure shaft is communicated to said secondary mounting arm through said inserted metal when said translating shaft is moved to said extended position.

* * * * *